Feb. 16, 1943.   R. P. DEWEY   2,310,941
MOTOR CONTROL
Filed April 4, 1941   4 Sheets-Sheet 1
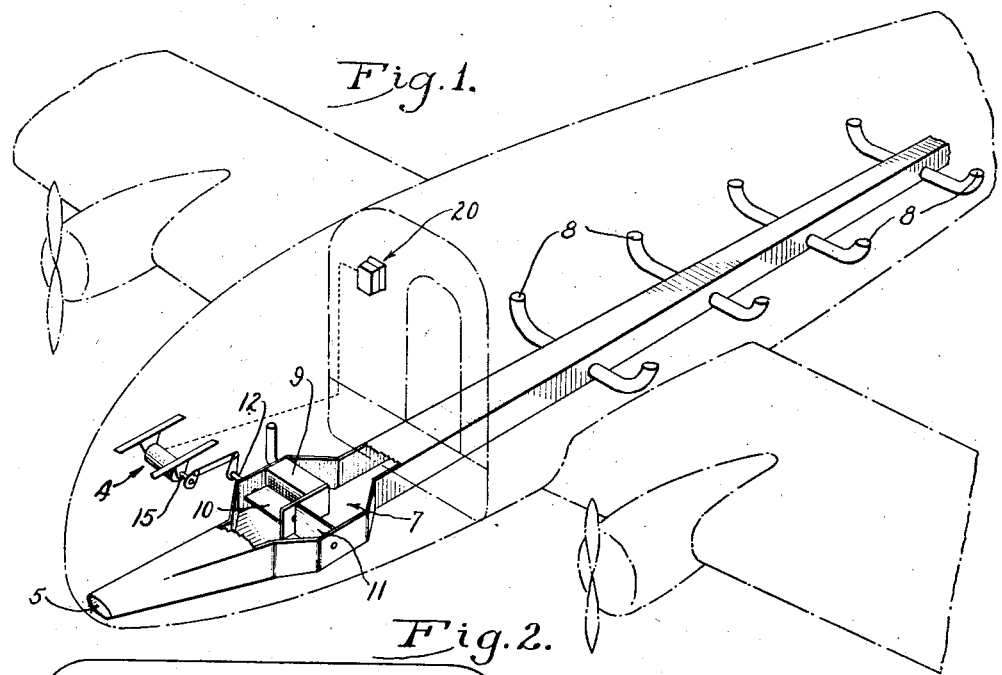
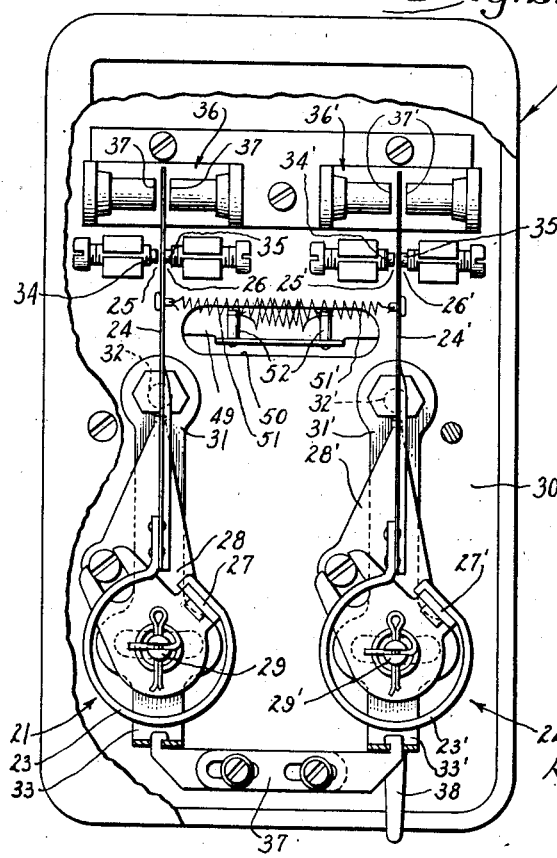
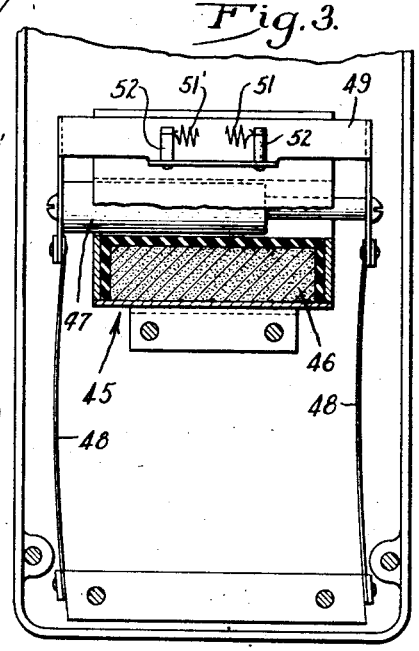
INVENTOR
Ritchie P. Dewey
BY
Parker, Carlson, Pitzner & Hubbard
ATTORNEYS Feb. 16, 1943.  R. P. DEWEY  2,310,941
MOTOR CONTROL
Filed April 4, 1941  4 Sheets-Sheet 2
Fig. 4.
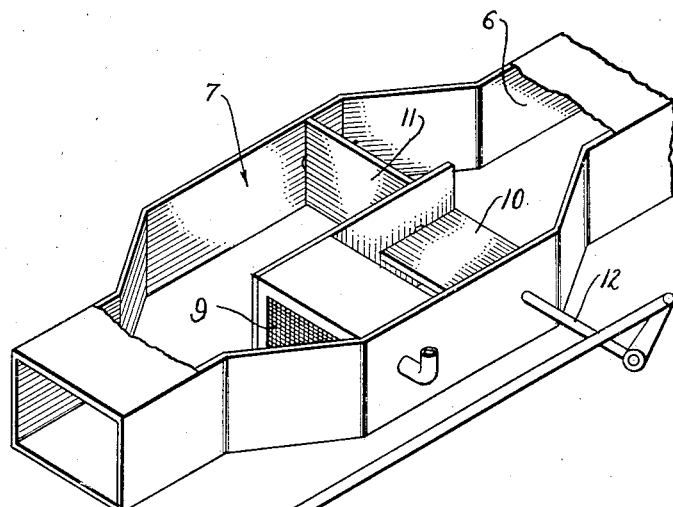
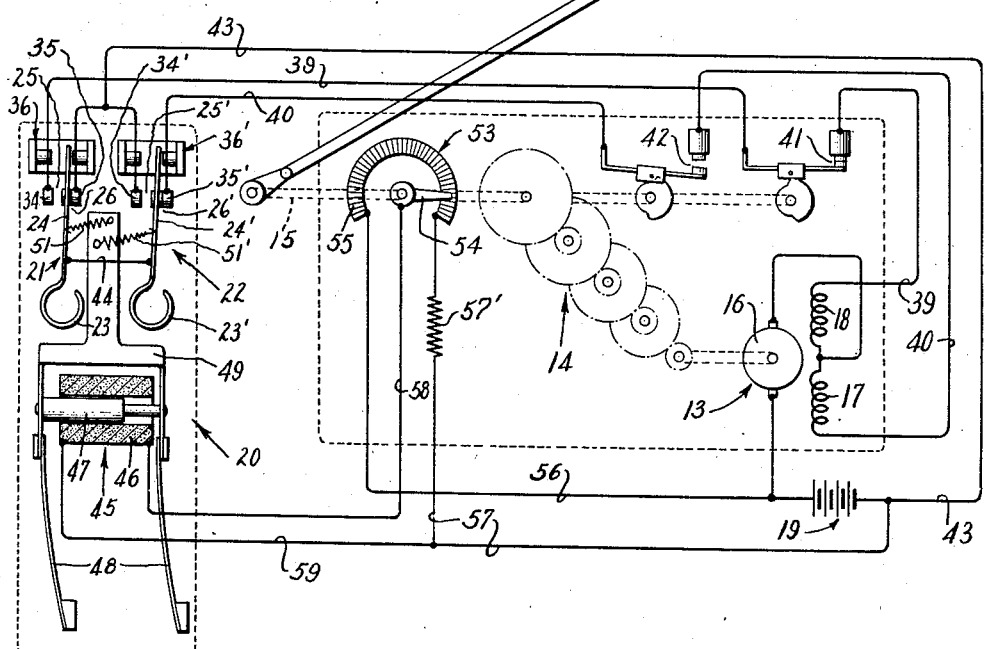
INVENTOR
Ritchie P. Dewey
BY
Parker, Carlson, Pitzner, Hubbard
ATTORNEYS Feb. 16, 1943.        R. P. DEWEY        2,310,941
MOTOR CONTROL
Filed April 4, 1941         4 Sheets-Sheet 3

INVENTOR
Ritchie P Dewey
BY
Parker, Carlson, Pitzner & Hubbard
ATTORNEYS

Feb. 16, 1943.　　　R. P. DEWEY　　　2,310,941
MOTOR CONTROL
Filed April 4, 1941　　　4 Sheets-Sheet 4

INVENTOR
Ritchie P. Dewey
BY
ATTORNEYS

Patented Feb. 16, 1943

2,310,941

UNITED STATES PATENT OFFICE 2,310,941

MOTOR CONTROL

Ritchie P. Dewey, Rockford, Ill., assignor to Barber-Colman Company, Rockford, Ill., a corporation of Illinois Application April 4, 1941, Serial No. 386,877

15 Claims. (Cl. 236—74)

This invention relates to controls of the so-called proportioning type for governing the operation of a motor or servo actuator to change the position of a controlled object in proportion to changes in the position of a controlling object or in a controlling condition.

The general object is to provide a control of the above general character which is not affected by severe vibration of its controlling instrument.

The invention also resides in the novel construction of the control mechanism which contributes to sensitivity and reliable operation under widely varying conditions of service use.

Other objects and advantages of the invention will become apparent from the following detailed description taken in connection with the accompanying drawings, in which Figure 1 is a perspective view of an air conditioning system embodying the present invention and applied to an airplane shown in phantom.

Fig. 2 is an elevational view of the controlling thermostat with part of its casing broken away.

Fig. 3 is a fragmentary rear elevational view of the thermostat.

Fig. 4 is a schematic view and wiring diagram.

Figure 5:
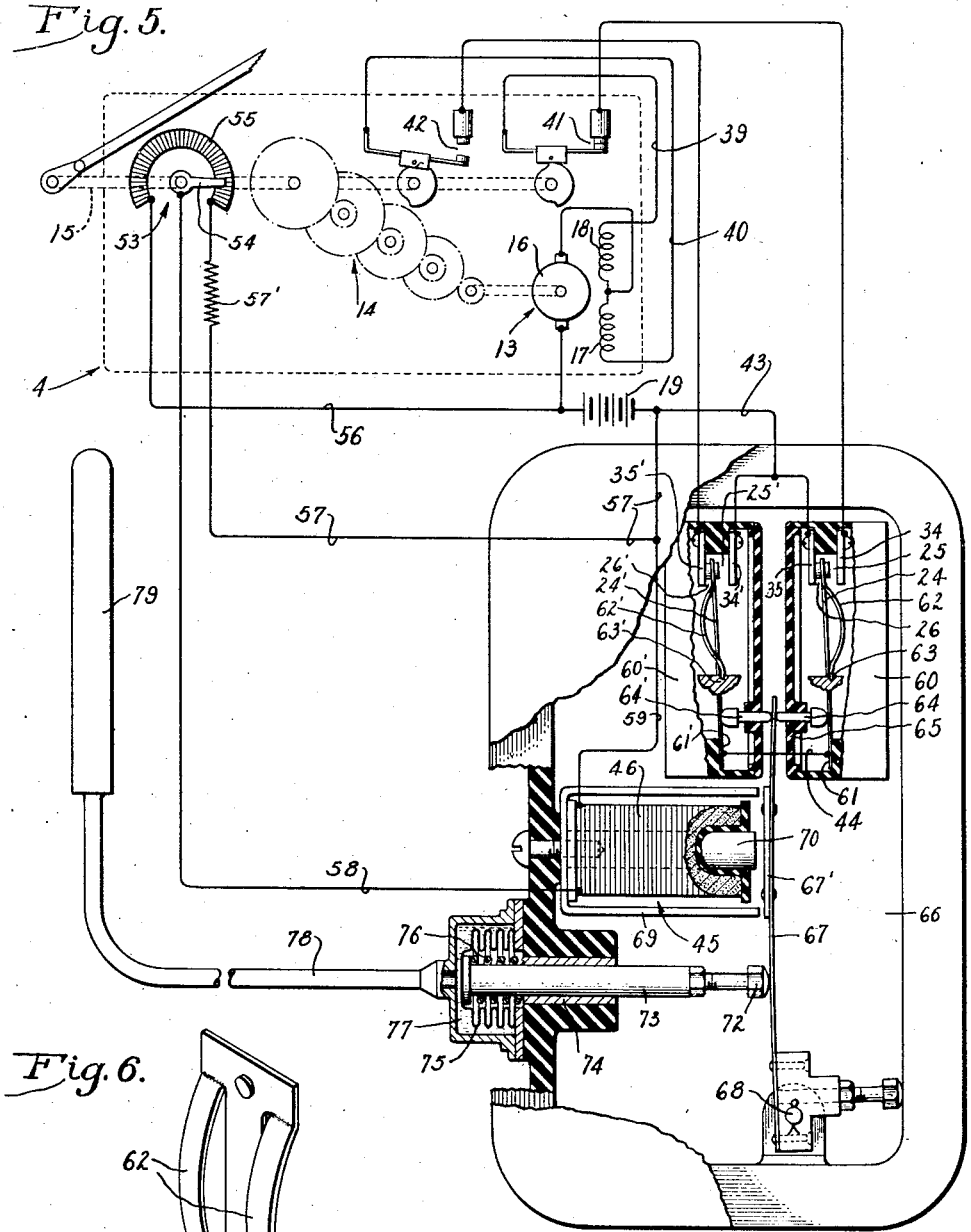
Figs. 5 and 7 are schematic views and wiring diagrams of modified forms of the control.
Figure 6:
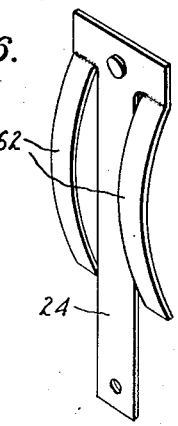
Fig. 6 is a perspective of the modified switch arm and its detent.

While the invention is applicable to a wide variety of uses and is susceptible of various modifications and alternative constructions, I have shown in the drawings and will describe herein several typical constructions and uses. It is to be understood that I do not intend to limit the invention by such exemplary disclosures but aim to cover all modifications and alternative constructions and uses falling within the spirit and scope of the invention as expressed in the appended claims.

Figs. 1 to 4 show the invention incorporated in a servo actuator for the regulating devices of the heating system of an airplane, this being one use where the controlling instrument is subjected to considerable vibration. The regulating members are in the form of face and by-pass dampers 10 and 11 for a radiator coil 9 within a chamber 7 through which air is drawn from a fresh air inlet 6 and is delivered through ducts 8 to the cabin space to be heated.

Herein, the damper shaft is arranged to be oscillated varying distances back and forth by a reversible power operator 4 including an electric motor 13 operating through speed-reduction gearing 14 to drive a shaft 15 connected by suitable cranks and a link to the damper shaft. The motor shown is of the direct current series type having a rotor 16 arranged to turn the damper shaft clockwise and counterclockwise respectively according to which of two windings 17 and 18 is energized from a current source such as a battery 19.

For this use, the force by which the servo actuator is controlled is derived automatically in response to condition changes, temperature in this instance, detected by an instrument 20 located in the space being heated. In accordance with the present invention, the instrument comprises two control elements, herein shown as switch actuating arms 24 and 24' movable independently of each other in response to changes in the controlling force and preferably with a detent or snap action so that each element always occupies one of two definite positions, there being four positions in all. Devices in the form of switches actuated by the respective elements control the motor windings in a manner such that one winding is effective when one element is in one of its positions, the other winding is effective when the other element is in its opposite position, and the motor is idle when both elements are in their other positions.

Figure 7:
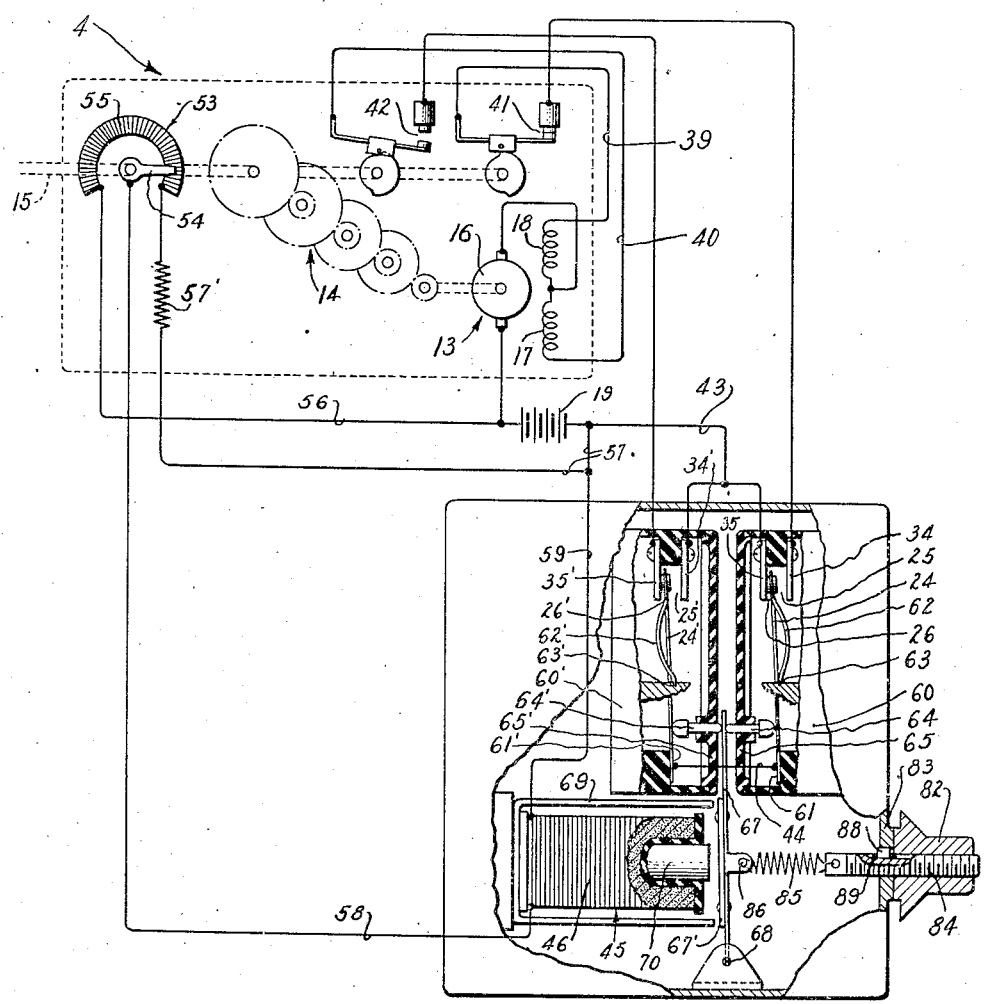

While provision may be made for movement of the control elements 24 and 24' by a single controlling force as in the modifications shown in Figs. 5 and 7, individual means are employed in the form shown in Figs. 1 to 4. Accordingly, the arms 24 and 24' are carried by thermostatic members in the form of separate strips 23 and 23' of bimetal. The control devices take the form of switches 25 and 26 of the open contact type having their common contact carried by the element 24 and its actuating strip 23. Switches 25' and 26' are similarly actuated by the strip 24' through the medium of the control element 23'. It will be observed that the thermostatic strips and the associated arms and switches constitute separate thermostats 21 and 22.

In the case of the thermostat 21, the element 23 is fixed at 27 to a lever 28 which is fulcrumed on a pin 29 on an insulating plate 30. The lever 28 is connected at its upper end to a lever 31 pivoted at 32 so that by shifting the lower end 33 of the lever 31, the control point of the thermostat may be raised or lowered as desired. At its upper end, the arm 24 is disposed between stationary contacts 34 and 35 with which it coacts to form the control switches 25 and 26.

Means is provided for causing movement of the arm 24 between the contacts 34 and 35 with a quick snap action and thereby avoiding arcing at the contact surfaces even when the thermostat is subjected to severe vibration. This means may comprise a magnetic detent 36 having permanent magnetic pole faces 37 spaced slightly farther apart than the contact surfaces and disposed on opposite sides of the arm which is composed of magnetic material. The arrangement is such that when the arm is disposed midway between the contacts, it is on the magnetic center of the gap between the pole faces. The arm moves against the contact 34 to close the switch 25 whenever the ambient temperature rises above a value predetermined by the setting of the lever 33. Similarly, when the temperature falls below a slightly lower value, the stress in the bimetal is changed sufficiently to overcome the detent action and cause reverse movement of the arm and closure of the switch 26. The temperature range above and below which the switches 25 and 26 are respectively closed may be made comparatively narrow, usually about one degree Fahrenheit, and the position of this range which may be adjusted manually constitutes the control point of the thermostat.

The thermostat 22 is of the same construction and its parts are indicated by primed numbers. This thermostat is mounted on the plate 30 to one side of the other thermostat and preferably is adjusted so that its control range is slightly lower, about one degree, than that of the thermostat 21.

To permit the control range of the instrument formed by the two thermostats to be varied while maintaining the fixed relation above described, the adjusting arms 33 and 33' are joined by a two part link 37 shiftable by a handle 38. The link may be lengthened and shortened to vary the total differential of the instrument.

To control the damper operator as contemplated by the present invention, the switches 25 and 26', of the different thermostats govern the energization of the respective motor windings 18 and 17. Preferably effective operation of the motor in response to closure of either of these switches is also conditioned on closure of the corresponding switch 25' or 26 of the other thermostat. For these purposes, the contacts 34 and 35' are connected to the motor windings 18 and 17 through conductors 39 and 40 having cam actuated limit switches 41 and 42 interposed therein. Both contacts 34' and 35 are connected to a common conductor 43 leading to one side of the battery 19 and the arms 24 and 24' are connected together by a conductor 44.

Provision is made for changing the control range of the combined thermostatic instrument progressively with changes in the position of the motor driven member or damper 10 so that the latter will occupy a different position for each temperature or value of the controlling force whereby to produce a true proportioning action. For this purpose, electromagnetic means 45 associated with the instrument exerts a variable force on both of the switch arms 24 and 24'. The magnet shown is of the solenoid type comprising a stationary coil 46 mounted on the back of the plate 30 with its axis disposed horizontally. Projecting partially through the coil is a plunger armature 47 supported for axial movement by spring arms 48. A yoke 49 rigid with opposite ends of the armature projects forwardly through an aperture 50 in the plate 30. To transmit the magnetic force to each of the switch arms 24 and 24', light contractile springs 51 and 51' are stretched between pins 52 on the forwardly projecting end of the yoke and the respective arms.

The solenoid winding is energized from the battery 19 under the control of a potential dividing rheostat 53 having a slider 54 fast on the operating shaft 15. The slider engages a resistance element 55 opposite terminals of which are connected to the battery terminals by conductors 56 and 57, interposed in the latter of which is resistor 57' for the purpose of making the proportioning action more nearly linear. One terminal of the solenoid is connected to the slider by a conductor 58 and the other to the conductor 57 by a conductor 59. The voltage applied to the winding is thus determined by the voltage drop between the slider and the battery lead 57.

With the parts positioned as shown in Fig. 4, the thermostat instrument is calling for heat and the control motor has run the by-pass damper to the fully closed position and the face damper to the fully open position determined by the limit switch 42. As the cabin temperature increases, the control point of the thermostat 22 will first be exceeded whereupon the arm 24' will be moved with a snap action to close the switch 25'. No circuit is complete, however, until the temperature has risen further above the control point of the thermostat 21 whereupon the stress in the bimetal 23 overcomes the forces of the solenoid and detent 36 and moves the arm 24 across the switch gap and against the contact 34. A circuit for the motor winding 18 is thus completed extending from the battery through the conductor 43, switch 25', arm 24', conductor 44, arm 24, switch 25, conductor 39, limit switch 41, the winding 18, and armature 16. In the ensuing operation of the motor, the shaft 15 and dampers are turned counterclockwise correspondingly opening the by-pass damper, closing the face damper and decreasing the capacity of the heater 9. During this movement, the slider 54 moves across the resistance 55 increasing the voltage applied to the solenoid 46 and correspondingly raising the effective control point of both thermostats. This movement continues until the magnetic force overcomes the stress of the bimetal 23 and the force of the detent 36 whereupon the switch 25 is opened stopping the motor. As a result of this operation of the motor, the damper is advanced to a position exactly corresponding to the prevailing increased temperature. If the temperature continues to rise, the switch 25 will again be closed and further opening of the by-pass damper and closing of the face damper will take place until the thermostat 21 is again satisfied and the control point of the thermostat 22 correspondingly increased.

Assume now that the cabin temperature falls below the prevailing control point of the thermostat while the switches 26 and 25' are both closed. The switch 26' will be closed with a snap action and since the switch 26 is already closed, a circuit for the motor winding 17 is completed through the switches 26 and 26' and the limit switch 42. The motor runs in a direction to turn the shaft 15 clockwise, to open the face damper and close the by-pass damper. The effective capacity of the heater is thus increased progressively until the accompanied decrease in the solenoid pull permits the bimetal 23' to open the switch 26'. As before, the change in damper position will be exactly proportional to the ambient temperature decrease.

From the foregoing, it will be seen that the main switch 25 of one thermostat governs the movement of the regulating device or damper in one direction while the correspondingly opposite switch 26' of the other thermostat governs the reverse movement. Thus, the condition of balance of the combined instrument, that is, the condition of the switches for maintaining the motor idle, is not dependent on positioning of either switch arm intermediate its coacting contacts as a result of which each arm 24 and 24' may be equipped with a detent and move with a snap action independently of the other arm. The condition of balance occurs when both of the arms 24 and 24' are in positions opposite to those shown in Fig. 4, that is, against the stops 35 and 34'. By associating the solenoid with each of the two thermostats, the control points of both will be varied simultaneously always maintaining the proper relation between their settings.

If desired, the operation of the motor in both directions may be controlled by the main switches 25 and 26' alone, the switches 26 and 25' then being omitted from the motor circuits. It is preferred, however, to include these switches and make the effective starting of the motor by closure of either of the main switches dependent upon the closure of the corresponding switch of the other thermostat. This insures proper operation in the manner described above even under abnormal conditions. Thus, the detents may be constructed to produce the desired snap action and maintain the desired contact pressure while exerting a minimum force and providing maximum sensitivity of the control instrument. Also, the operation is not changed by the occurrence of vibration so severe as to dislodge either of the switch arms against the action of its detent or by an unintentional change in the calibration of one thermostat during service use.

Fig. 5 shows a modification of the automatic control above described involving the use of a different type of switch detent and a single condition responsive element arranged to actuate both sets of control switches. The corresponding parts bear the same reference numerals. The two sets of switch contacts 34, 35 and 34', 35' are mounted in separate insulating housings 60 and 60' in which the switch arms 24 and 24' are secured cantilever fashion at 61 and 61'. Integral with the arm 24 are spring fingers 62 which project toward the supported ends of the arm and have their free ends fastened at 63. These fingers are bowed in a manner such as to cause the arm to move over-center in either direction with a snap action in response to a small movement imparted to the arm 24. The arm 24 thus always occupies one of two positions in which the switches 25 and 26 are respectively closed. Also, the arm and the detent are so constructed that the arm is biased in a direction to close the switch 26 when freed.

The switches 25' and 26' are similarly mounted and actuated, the arm 24' tending to move in a direction to close the switch 25'. Motion is imparted to the switch arms 24 and 24' by pins 64 and 64' slidable in the casing covers 65 and 65' and having enlarged inner ends in bearing contact with the arms 24 and 24' at points near the fulcrums of the latter. The switch casings are mounted adjacent each other on a panel 66 with the projecting ends of the pins 64 and 64' alined and disposed adjacent each other on opposite sides of an elongated spring arm 67 adjustably fulcrumed at 68 on the panel 66. Near its free end, the spring arm carries a strip 67' of iron which constitutes the armature of the magnet 45. In this instance, the latter includes a U-shaped field member 69 mounted on the panel and connected to a core 70 which carries the magnet coil 46 and has its free end disposed adjacent but spaced from the armature 67'. As before, the magnet is energized constantly and biases the arm 67 in a direction to close the switch 26'.

The magnet force is opposed by the initial stress of spring arm 67 combined with a variable force which is derived automatically in this instance in response to condition changes, that is, temperature. Herein this latter force is applied to the spring arm 67 by a bar 73 one end of which carries an adjustable screw 72 bearing against the spring between the fulcrum 68 and the magnet and the other end of which slides in a bushing 74 and is connected to a bellows 75 collapsed by a spring 76. The closed end of the bellows constitutes a piston within a fluid chamber 77 communicating through a capillary tube 78 with a thermostatic bulb 79. The latter constitutes a single element for actuating the switch arms 24 and 24' automatically in response to condition changes.

As in the form shown in Figs. 1 to 4, the switch arms 24 and 24' are movable independently of each other and each occupies either of two definite positions by virtue of the over-center action of the detent springs 62 and 62'. The switches 25, 26 and 25', 26' are operated in the same sequence as before. Thus, as the temperature of the bulb 79 is raised, the force exerted by the arm 67 on the pin 64' decreases until the arm 24' is allowed to move over-center against the contact 34'. As the temperature increase continues, the arm 67 exerts an increasing force on the pin 64, the arm 24 moving with a snap action against the contact 34 when the over-center condition is attained. In reponse to such actuation of the switches, the motor operator and the magnet 45 are controlled as before to change the position of the driven shaft 15 in accordance with changes in the temperature of the thermostatic bulb 79.

Frequently, it is desirable to control the servo actuator from a remote point and cause the driven member 15 thereof to follow accurately the movements of a controlling member which may be adjusted manually or automatically. Fig. 7 shows such an application, the parts in common with the apparatus shown in Fig. 5 bearing the same reference numbers.

In this instance, the controlling object is a manually adjustable rotary knob 82 mounted on a plate 83 to turn about an axis perpendicular to the spring arm 67. Suitable indicia on the knob and plate may be provided to facilitate gauging the angular position of the knob. The latter is threaded onto the projecting end of a screw 84 which is supported in the plate 83 with a lug 88 on the plate projecting into a longitudinal slot 89 in the screw. The inner end of the screw is connected by a coiled contractile spring 85 to a cross-pin 86 on the arm 67 opposite the magnet 45. The spring 85 is under continuous tension opposing the pull of the magnet and the forces exerted by the spring switch arms 24 and 24'. By turning the knob in one direction, the screw will be drawn outwardly increasing the spring tension and eventually allowing the arm 24' to move over-center under its normal bias and close the switch 25'. Continued turning in the same direction increases the force applied to the switch arm 24 until this arm is moved to close the switch 25. Conversely, by turning the knob in the reverse direction starting with the switch 25 closed, the spring effect is decreased, first allowing the arm 24 to open the switch 25 and close the switch 26 and then, with further turning, to open the switch 25' and close the switch 26'.

The operation of the control is the same as first described. In response to closure of the switch 25 combined with closure of the switch 25', the motor winding 18 is energized and the shaft 15 is turned counter-clockwise until the pull of the magnet 45 has, by the action of the rheostat 53, been increased sufficiently to overcome the increased tension of the spring 85 and allow the switch arm 24 to move and close the switch 26. This stops the motor with the shaft 15 in an angular position corresponding to the changed position of the knob 82. Now, if the knob is turned reversely causing closure of the switch 26', the motor will run and turn the shaft 15 clockwise until the reduced pull of the magnet 45 allows the spring 85 to move the arm 67 far enough to open the switch 26'. Again the angular displacement of the shaft 15 will have been proportional to the change in the adjustment of the control knob.

I claim as my invention:

1. A control for a servo actuator having a reversible electric motor driving means and a member driven thereby, said control having, in combination, two switches respectively controlling the operation of said driving means in opposite directions, elements subjected to a variable control force and movable independently of each other through slightly different ranges to actuate the respective switches, detent means associated with the respective elements to cause movements of each element with a snap action, electromagnetic means exerting a constant but variable force on said elements counteracting said control force, selectively operable means for varying the value of said control force, and means operable in unison with said driven member following starting of the driving means by either of said switches to vary the energization of said electromagnetic means in a direction to cause a reversal in the position of the controlling switch element.

2. A proportioning control for modulating a member to be controlled having, in combination, an element movable in opposite directions between two limit positions with rises above and falls below a predetermined condition range, a second independent element movable in opposite directions between two limit positions with condition rises above and falls below a range differing slightly from said first range, separate magnetic detents one for each of said elements operable to cause movement thereof with a snap action, a reversible power operator controlled by said elements and operable to move said member in one direction in response to movement of one element by a condition increase and in the other direction in response to movement of the other element by a condition decrease, electromagnetic means biasing said elements toward corresponding ones of their limit positions, and means operable to increase and decrease the energization of said electromagnetic means progressively with the movements of said member in opposite directions.

3. A proportioning control for modulating the position of a member having, in combination, two control instruments independently responsive to condition changes through slightly different ranges and each having an element movable between two limit positions with a snap action, means operable in response to movement of one of said elements by a condition deviation in one direction to cause movement of said member in a corresponding direction, means operable in response to movement of the other element by a reverse condition to cause reverse movement of said member, the member remaining idle at intermediate condition values when said elements are in their other positions, normally energized electrical means biasing each of said elements in the direction of one condition change, and means controlling said electrical means to increase and decrease its biasing force progressively with the movements of said member in opposite directions.

4. A proportioning control for modulating the position of a member having, in combination, two control instruments independently responsive to condition changes through adjacent ranges and each having an element movable between two limit positions with a snap action, control means operable when one of said elements is disposed in one position and the other element is in the corresponding position to cause movement of said member in a direction corresponding to the position of the elements, control means operable in response to reverse positioning of both of said elements by a reverse condition change to cause reverse movement of said member, normally acting means biasing each of said elements in the direction of one condition change, and means controlling said biasing means to increase and decrease its biasing force progressively with the movements of said member in opposite directions.

5. A proportioning control having, in combination, first and second control elements respectively movable between spaced limit positions at adjacent but different values of a controlling condition, detent means associated with the respective elements and acting to cause movement of each element with a snap action, a reversible power driven operator having a driven member and operable in one direction under the control of said first element provided that the second element is in its corresponding position, said operator operating reversely when both elements are in their other positions, and means operable automatically to raise and lower the control points of both of said elements in unison with the opposite movements of said driven member.

6. A proportioning control having, in combination, two independently movable condition responsive elements each movable with a snap action in response to condition changes through slightly different ranges, a reversible power operator having a driven member and operable to move said member in one direction under the control of one of said elements and in the other direction under the control of said other element, and means operable to respectively increase and decrease the control point of both of said elements progressively in unison with the opposite movements of said member.

7. A proportioning control having, in combination, means providing a variable control force, two independently movable control elements responsive to said control force and respectively movable between spaced limit positions through slightly different ranges of said force, detent means associated with the respective elements and acting to cause movement of each element with a snap action, a reversible power driven operator having a driven member and operable in one direction under the control of one of said elements and in the other direction under the control of the other element, and means operable automatically to raise and lower in unison with the opposite movements of said driven member the values of said control force at which said elements are moved under the action of their respective detent means.

8. A proportioning control having, in combination, a condition responsive control instrument having control means providing at least three control positions, a plurality of detents operable to cause movement of said control means with an uninterrupted snap action to each of said positions from another of the positions, a reversible power operator controlled by said instrument and having a driven member moved in opposite directions when said control means is in two of said positions respectively and idle when the control means is in the third position, and means operable to shift the control point of said instrument progressively with the movements of said member and in directions corresponding to such movements.

9. A proportioning control having, in combination, control means subjected to a variable control force and movable with an uninterrupted snap action from one to another of at least three control positions, a reversible power operator controlled by said means and having a driven member moved in opposite directions when the control means is in two of said positions respectively and idle when the control means is in the third position, and means operable progressively with the movements of said member to change the values of said control force at which the movements of said control means occur.

10. A proportioning control having, in combination, two condition responsive instruments having adjacent but different control points and operable independently of each other, a reversible power operator having a driven member and operable in one direction under the control of one of said instruments and in the opposite direction under the control of the other instrument, and means operable to shift the control points of both of said instruments progressively with the movements of said member and in directions corresponding to such movements.

11. A control for a servo actuator having a reversible electric motor driving means and a member driven thereby, said control having, in combination, two devices respectively controlling the operation of said driving means in opposite directions, elements subjected to a variable control force and movable independently of each other through slightly different ranges of said control force to actuate the respective devices, detent means associated with the respective elements to cause movements of each element with a snap action between two limit positions, electromagnetic means exerting a continuous but variable force on said elements counteracting said control force, and means operable in unison with said driven member following starting of the driving means by one of said switches to vary the energization of said electromagnetic means in a direction to cause a reversal in the position of the controlling switch element.

12. A control of the character described having, in combination, an actuating member, means exerting a variable control force on said member in one direction, two switch arms disposed side by side and normally tending to move toward each other, detent means associated with said arms for causing movement of each arm with a snap action independently of movement of the other arm and through a slightly different range, said actuating member having bearing engagement with said arms to move one arm in one direction and the other arm in the other direction during movement of the member in opposite directions, electromagnetic means normally biasing said member in a direction opposite to said first mentioned direction, and means responsive to movement of one of said arms into one of its positions to increase the force of said electromagnetic means and to decrease such force while the other arm is in its opposite position.

13. A control of the character described having, in combination, a single condition responsive means exerting a variable control force, two switch arms disposed side by side and normally tending to move toward each other, said arms being biased in one direction by said control force, detent means associated with said arms for causing movement of each arm with a snap action independently of movement of the other arm and through slightly different ranges of said force, an actuating member having bearing engagement with said arms, electromagnetic means normally biasing said member in a direction opposite to said first mentioned direction, and means controlling the energization of said electromagnetic means.

14. A control of the character described having, in combination, an actuating member, resilient means connected to said member and exerting a control force on the member in one direction, two control elements disposed side by side and normally tending to move toward each other, detent means associated with said elements for causing movement of each element with a snap action through slightly different ranges of said force and independently of movement of the other element between two limit positions, said actuating member having bearing engagement with said elements, electromagnetic means normally biasing said member in a direction opposite to said first mentioned direction, means for adjusting the stress of said resilient means a reversible power driven actuator operable in one direction when one element is in one limit position and in the other direction when the other element is in one position, said actuator being idle when the two elements are in their other limit positions, and means driven by said actuator and operating to vary the force of said electromagnetic means in a direction to balance said resilient force.

15. In a control of the character described having, in combination, an actuating member, electromagnetic means normally biasing said member in one direction, resilient means connected to said member and exerting a control force on said member in the opposite direction, two control elements disposed side by side and normally tending to move toward each other, detent means associated with said elements for causing movement of each element with a snap action independently of movement of the other element between two limit positions and through slightly different ranges of said control force, said actuating member having bearing engagement with said elements, and means for adjusting the stress of said resilient means.

RITCHIE P. DEWEY.